US 7,006,481 B2

(12) United States Patent
Terry

(10) Patent No.: US 7,006,481 B2
(45) Date of Patent: Feb. 28, 2006

(54) SYSTEM AND METHOD FOR INTEGRATING WLAN AND 3G

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 121 days.

(21) Appl. No.: 10/681,025

(22) Filed: Oct. 8, 2003

(65) Prior Publication Data

US 2004/0077374 A1 Apr. 22, 2004

Related U.S. Application Data

(60) Provisional application No. 60/417,530, filed on Oct. 10, 2002.

(51) Int. Cl.
*H04Q 7/24* (2006.01)
(52) U.S. Cl. .................. 370/338; 370/401; 455/436
(58) Field of Classification Search ............. 370/338, 370/337, 336, 345, 347, 360, 401, 402, 406, 370/256, 257, 331, 390, 389, 400; 455/432, 455/435, 436; 712/2, 215, 208, 22, 228, 712/223, 204
See application file for complete search history.

(56) References Cited

U.S. PATENT DOCUMENTS

| 6,230,005 B1 | 5/2001 | Le et al. |
| 6,243,581 B1 | 6/2001 | Jawanda |
| 6,466,556 B1 * | 10/2002 | Boudreaux ................ 370/331 |
| 6,659,947 B1 | 12/2003 | Carter et al. |
| 6,708,031 B1 * | 3/2004 | Purnadi et al. ............ 455/436 |
| 6,744,753 B1 * | 6/2004 | Heinonen et al. .......... 370/338 |
| 6,850,503 B1 * | 2/2005 | Dorenbosch et al. ....... 370/331 |
| 6,873,611 B1 * | 3/2005 | Rios .......................... 370/338 |
| 6,876,642 B1 * | 4/2005 | Adams et al. .............. 370/338 |
| 2003/0139180 A1 | 7/2003 | McIntosh et al. |

FOREIGN PATENT DOCUMENTS

| CN | 1150511 A | 5/1997 |
| CN | 1335032 A | 2/2002 |
| WO | 95/33348 | 12/1995 |
| WO | 9533348 | 12/1995 |
| WO | 00/44189 | 7/2000 |
| WO | 0044189 | 7/2000 |
| WO | 01/35585 | 5/2001 |
| WO | 01/93614 | 12/2001 |
| WO | 0193614 | 12/2001 |

OTHER PUBLICATIONS

Wietfeld et al., "Seamless IP-Based Service Integration Across Fixed/Mobile And Corporate/Public Networks", Vehicular Technology Conference, IEEE, May 1999, pp. 1930-1934.

* cited by examiner

*Primary Examiner*—Hassan Kizou
*Assistant Examiner*—Ricardo Pizarro
(74) *Attorney, Agent, or Firm*—Volpe and Koenig, P.C.

(57) ABSTRACT

A method and system for providing ubiquitous coverage and seamless connectivity for devices which support Internet access via third generation (3G) cellular and IEEE 802.11 wideband local area network (WLAN) technologies, irrespective of which radio access technology is available.

32 Claims, 4 Drawing Sheets

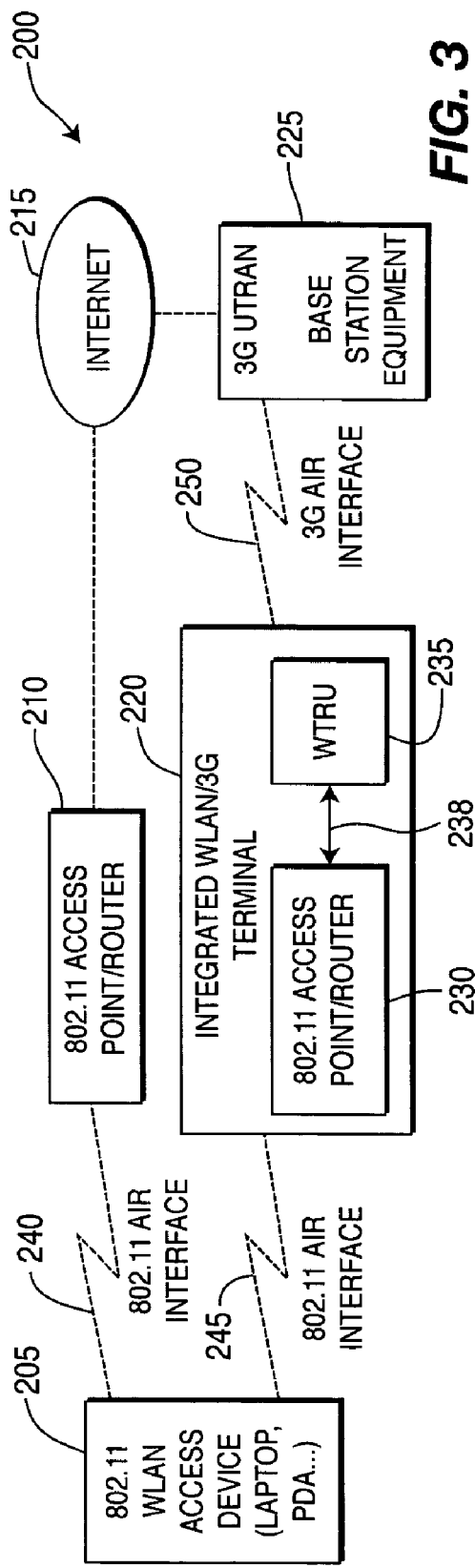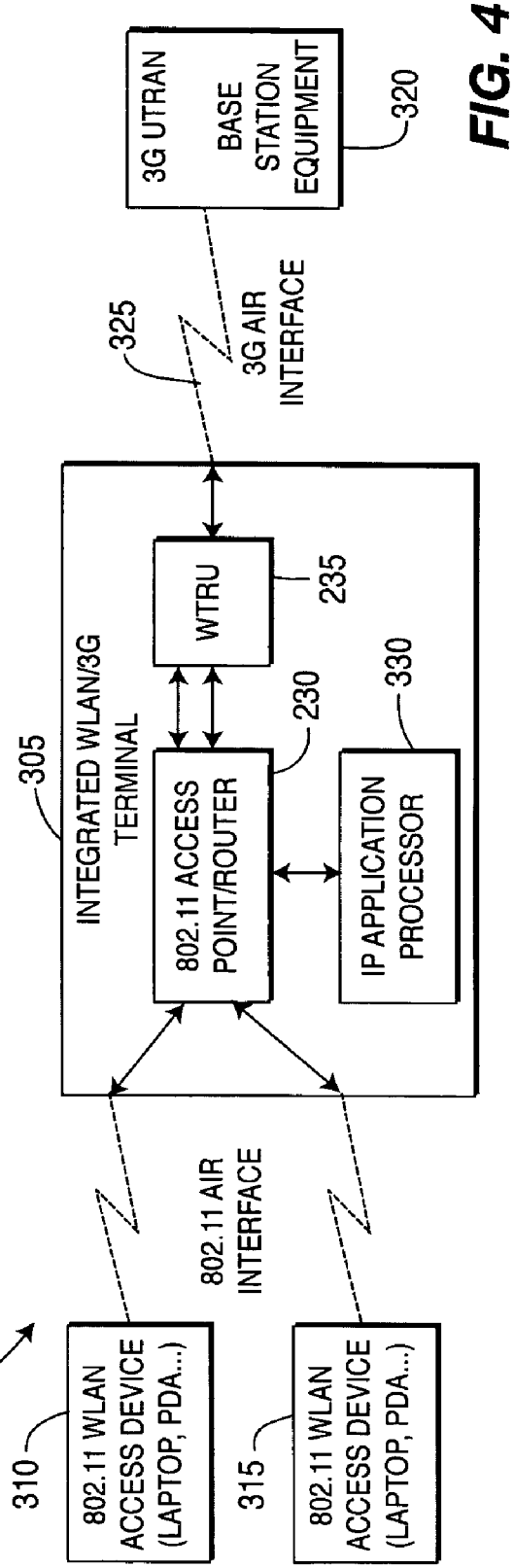

SYSTEM AND METHOD FOR INTEGRATING WLAN AND 3G

CROSS REFERENCE TO RELATED APPLICATION(S)

This application claims priority from U.S. patent application Ser. No. 60/417,530, filed Oct. 10, 2002, which is incorporated by reference as if fully set forth.

FIELD OF INVENTION

The present invention relates to the field of wireless communications and, more particularly, the present invention relates to the integration of wireless local area networks (WLAN) and cellular networks.

BACKGROUND

Currently, dual mode devices are envisioned to support Internet access via a wide array of different radio access technologies. The goal is to provide ubiquitous coverage and seamless connectivity irrespective of which radio access technology is available.

FIG. 1 shows a conventional dual mode mobile terminal system 100 including a dual mode mobile terminal 105. The two modes to which "dual mode" refers are a network which complies with IEEE 802.11 and a network which complies with one or more of the Third Generation (3G) standards. The dual mode mobile terminal 105 communicates with the Internet 110 via (1) an IEEE 802.11 access point/router equipment 115 over an IEEE 802.11 air interface, or (2) a 3G universal terrestrial radio access network (UTRAN) base station 120 via a 3G air interface.

A difficulty associated with such a conventional system 100 is that, due to architectural differences, there is no common control entity to manage the physical handover process between the IEEE 802.11 and 3G radio networks. This results in a complex association between the handover control functions of each network. For example, the coordination and logic required to transfer the radio connection from the IEEE 802.11 network to the 3G network is significantly different from what is required to transfer the radio connection from the 3G network to the IEEE 802.11 network. Note that the handover in this sense can also be viewed as cell reselection or re-association. What is needed is a system and method for seamlessly and simply facilitating wireless connectivity between two different radio access technologies.

Another problem is that 802.11 access devices require service from 802.11 access points that have dedicated terrestrial trunks to the Internet. When an 802.11 access point is unavailable, Internet services are not provided to the 802.11 access device. Since 802.11 access points are generally not provisioned to provide ubiquitous coverage the mobile user will often have access to Internet services. Further, dedicated terrestrial links providing Internet connectivity to the 802.11 access points in certain deployment scenarios are expensive to install and maintain. In these cases, an alternative to the terrestrial link is needed.

SUMMARY

A cellular terminal that incorporates 802.11 access technology (e.g., association/re-association processes) provides 3G connectivity for 802.11 access devices. The present invention allows a wireless device to have wireless service/connectivity over different types of wireless radio access technology, which allows for mobility and ubiquitous coverage for Internet services.

BRIEF DESCRIPTION OF THE DRAWING(S)

FIG. 3 is a high-level block diagram of an integrated dual mode system that provides Internet connectivity in accordance with the present invention;

FIG. 4 is a block diagram illustrating the routing of independent IP data services;

DETAILED DESCRIPTION OF THE PREFERRED EMBODIMENT(S)

Although the preferred embodiments are described in conjunction with a preferred system that uses IEEE 802.11 and 3G radio access technologies, the invention in its broad form is envisaged to be also applicable to other systems of transmission, without limitation.

Figure 1:
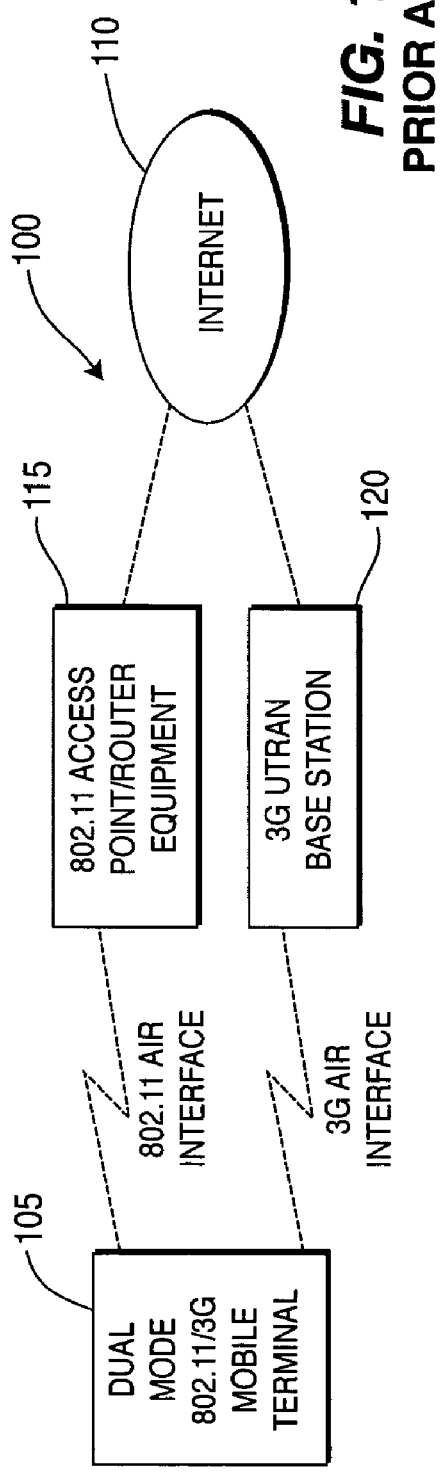
FIG. 1 is a high-level block diagram of a conventional dual mode mobile system that provides Internet connectivity.
Figure 2:
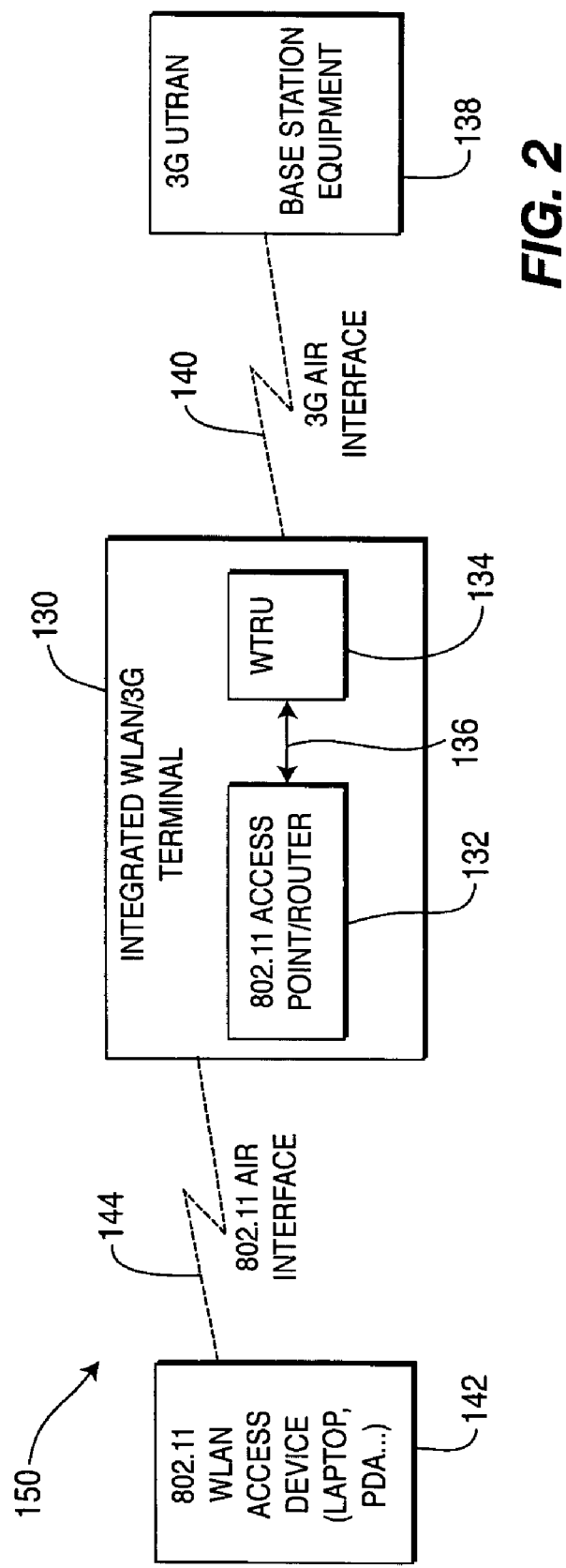
FIG. 2 is a high-level block diagram of a system that provides Internet connectivity in accordance with the present invention.

FIG. 2 shows a system 150 including an integrated IEEE 802.11 terminal 130 (hereinafter terminal 130). The terminal 130 includes an IEEE 802.11 Access Point (AP)/router 132 (hereinafter AP 132) and a 3G Wireless Transmit/Receive Unit (WTRU) 134 (hereinafter WTRU 134), which are coupled to each other via an interface 136. The terminal 130 is coupled with a 3G UTRAN 138 (hereinafter UTRAN 138) via a 3G air interface 140, and is coupled with an IEEE 802.11 WLAN access device 142 (hereinafter access device 142) via an IEEE 802.11 air interface 144.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Essentially, system 150 applies two air interfaces, e.g., a WLAN AP and a 3G user equipment (UE), in series rather than in parallel. This simplifies integration since each air interface is logically independent (i.e., a common control entity is not required) and thus is not affected by the other (i.e., each air interface runs as if the other air interface does not exist). For example, there is no need to coordinate handovers between each radio access technology (e.g., IEEE 802.11 to 3G, or vice versa). Handovers over the 3G air interface 140 can be handled transparently to the IEEE 802.11 air interface 144. In the case of an integrated AP 132/WTRU 134, a WLAN connection is established, which may dynamically cause the 3G connection to be established and/or allocate physical resources.

System 150 implements a standard IEEE 802.11 association or re-association process for transition from the access device 142 to a 3G cellular connection via the 3G air interface 140. A re-association is used when the AP is part of the same Extended Service Set (ESS) known by the Service Set Identifier (SSID) realized during active or passive scanning process. Otherwise, a different SSID is recognized and a new association is initiated. The access device generates an association request (AR) that includes a Basic Service Set ID (BSSID) (i.e., MAC ID) and an SSID normally corresponding to a group of access points that are part of an ESS. Each AP replies with an association response that includes an association ID (i.e., logical connection ID) unique to that AP.

The access device 142 realizes the terminal 130 by standard IEEE 802.11 active or passive scanning methods. When using passive scanning, the access device 142 receives one or more beacon transmissions from one or more APs. A beacon channel identifies certain types of system information, such as the access point's BSSID and SSID. When using active scanning, a level of security is provided whereby the AP's SSID is not signaled on the beacon channel. The access device 142 generates a probe request indicating a preconfigured SSID of an AP. APs which receive the probe request confirm reception with a probe response when they have the preconfigured SSID.

There are several alternative embodiments for operating the terminal 130 in accordance with the present invention. In one alternative embodiment, dynamic allocation is implemented, whereby the standard IEEE 802.11 logic (e.g., association, re-association, disassociation) is used to establish or release the 3G connection. In another alternative embodiment, a 3G connection is established in advance (i.e., continuously) with either dynamically or permanently allocated physical resources.

As will be described in detail hereinafter, when a mobile user travels outside of an IEEE 802.11 WLAN coverage area, which provides certain services such as a dedicated terrestrial termination to the Internet, the terminal 130 provides access to the Internet. The access device 142 will automatically re-associate with the terminal 130 without requiring any customized software or hardware. Alternatively, the access device 142 may always use the terminal 130, thus eliminating the need to provision one or more IEEE 802.11 APs with dedicated terrestrial Internet terminations.

FIG. 3 shows a system 200 operating in accordance with one preferred embodiment of the present invention. The system 200 includes an integrated IEEE 802.11 terminal 220 (hereinafter terminal 220) that facilitates seamless Internet connectivity between the different radio access technologies. The system 200 further includes an IEEE 802.11 WLAN access device 205 (hereinafter access device 205), an IEEE 802.11 AP/router 210 (hereinafter AP 210), the Internet 215 and a 3G UTRAN 225 (hereinafter UTRAN 225). The terminal 220 includes an IEEE 802.11 AP/router 230 (hereinafter AP 230) and a 3G WTRU 235 (hereinafter WTRU 235), which are coupled to each other via an interface 238. The terminal 220 is coupled with the 3G UTRAN 225 (hereinafter UTRAN 225) via a 3G air interface 250, and is coupled with the access device 205 via an IEEE 802.11 air interface 245. The access device 205 is initially associated with the AP 210 via a path 240. The terminal 220 is activated to establish an 3G air interface connection to an external network, such as the Internet 215, by either manually turning on the access device 205 and enabling the Internet access feature (e.g., by a user request/input) or by automatically detecting the IEEE 802.11 access device association procedures. Standard IEEE 802.11 authentication and data encryption security features may be incorporated to control unauthorized access. The access device 205 may be a laptop, a personal digital assistant (PDA) or the like.

The 3G cellular connection is initiated by the WTRU 235. The service type, packet domain, and other connection aspects are either preconfigured or manually requested by the user. The WTRU 235 and the UTRAN 225 establish a normal 3G connection to the Internet 215 upon either manual or automatic activation. Once established, the 3G cellular connection is transparent to the access device 205. The access device 205 realizes the terminal 220 by standard IEEE 802.11 active or passive scanning methods.

Upon disassociation of the access device 205 or upon timeout of a preconfigured inactivity timer, the 3G cellular connection may be released by the terminal 220 in response to an automatic detection of the IEEE 802.11 access device disassociation procedure or automatic timeout or an inactivity timer. Alternatively, the 3G cellular connection may be released manually by user intervention in response to turning off the device or disabling the Internet access feature. In either case, the 3G air interface connection to the Internet 215 is released.

The access device 205 initiates either the association or re-association to the integrated terminal 220 via path 245. The terminal 220 recognizes the access device 205 and establishes a 3G cellular radio connection via 3G air interface 250.

A similar process is invoked for association or re-association from the terminal 220 to the standard AP 210. Upon disassociation with the terminal 220 via IEEE 802.11 air interface 245, or timeout of the inactivity timer or re-association within the same ESS, the connection to the UTRAN 225 via the 3G air interface 250 is released.

In one embodiment, the terminal 220 may establish a permanent connection to the UTRAN 225 to allow for "always on" services, e.g., wireless local loop (WLL), or facilitate a fast handover between the IEEE 802.11 service provider and the 3G cellular service providers. In this case, the 3G radio access network (RAN) connection is pre-established. The terminal 220 provides a continuous IEEE 802.11 access link. The access device 205 invokes the normal IEEE 802.11 active/passive scanning, and association/re-association processes.

This embodiment may be implemented such that the 3G RAN user data radio bearers are pre-established prior to IEEE 802.11 association with the terminal 220, or upon detection of the access device 205. 3G radio resources are either dynamically allocated by the 3G Radio Network Controller (RNC) on an as needed basis realized by the existence of transmission data or statically assigned for the period during which the access device is associated with the AP. The IEEE 802.11 and 3G coverage areas may partially overlap for contiguous coverage. Alternatively, the IEEE 802.11 and 3G coverage may be physically disjoint. There is no limit to the distance between coverage areas. The IEEE 802.11 and 3G coverage areas may be co-located to provide redundancy. In general, IEEE 802.11 service areas are "hot spots" (i.e., "islands"). Service is provided between these IEEE 802.11 service areas by one or more 3G cellular systems. Each 3G service area will likely overlap at least one of the IEEE 802.11 service area.

FIG. 4 shows a system 300 for routing several IP data services in accordance with one embodiment of the present invention. System 300 includes an integrated IEEE 802.11 terminal 305 which is similar to terminal 220 except that it incorporates an Internet Protocol (IP) application processor 330 (hereinafter processor 330) with the AP 230 and supports a plurality of IEEE 802.11 WLAN access devices 310, 315 and a 3G UTRAN 320 (hereinafter UTRAN 320). A common set of physical channels provides for transmission over an 3G air interface 325 connecting the terminal 305 to the UTRAN 320. IP data is provided to the processor 330 which implements layer 3 IP switching within the terminal 305, which allows for several independent access devices and/or IP applications within the terminal 305 to be supported simultaneously.

In systems 150 and 200 (FIGS. 2 and 3), IP router functionality is not implemented. In system 300, the AP 230 switches IP data packets to either the external 802.11 access devices 310, 315, or to IP applications internal to the integrated terminal 305. Functionality is added to the terminal 305 not to the AP 230. For example, the terminal 305 may be the 3G mobile cellular terminal that has the ability to provide internet services (the "IP application"). This can still be accomplished, even when supporting Internet connectivity for one or more 802.11 access devices. Based on an IP address, data is routed by the AP 230 to and from multiple IEEE 802.11 WLAN access devices 310, 315 and IP applications 330 internal to the terminal 305.

The terminal 305 may be associated with several access devices 310, 315 (laptops, PDAs, etc.) at one time. Association and disassociation of each access device 310, 315 is an independent process. Each access device 310, 315 may have either common or independent 3G RAN connections and/or radio bearers supported by common radio resources. An Internet Protocol (IP) router function within the terminal 305 allows several independent IP data streams to be supported by a common set of physical channels assigned to the 3G radio connection.

Figure 5:
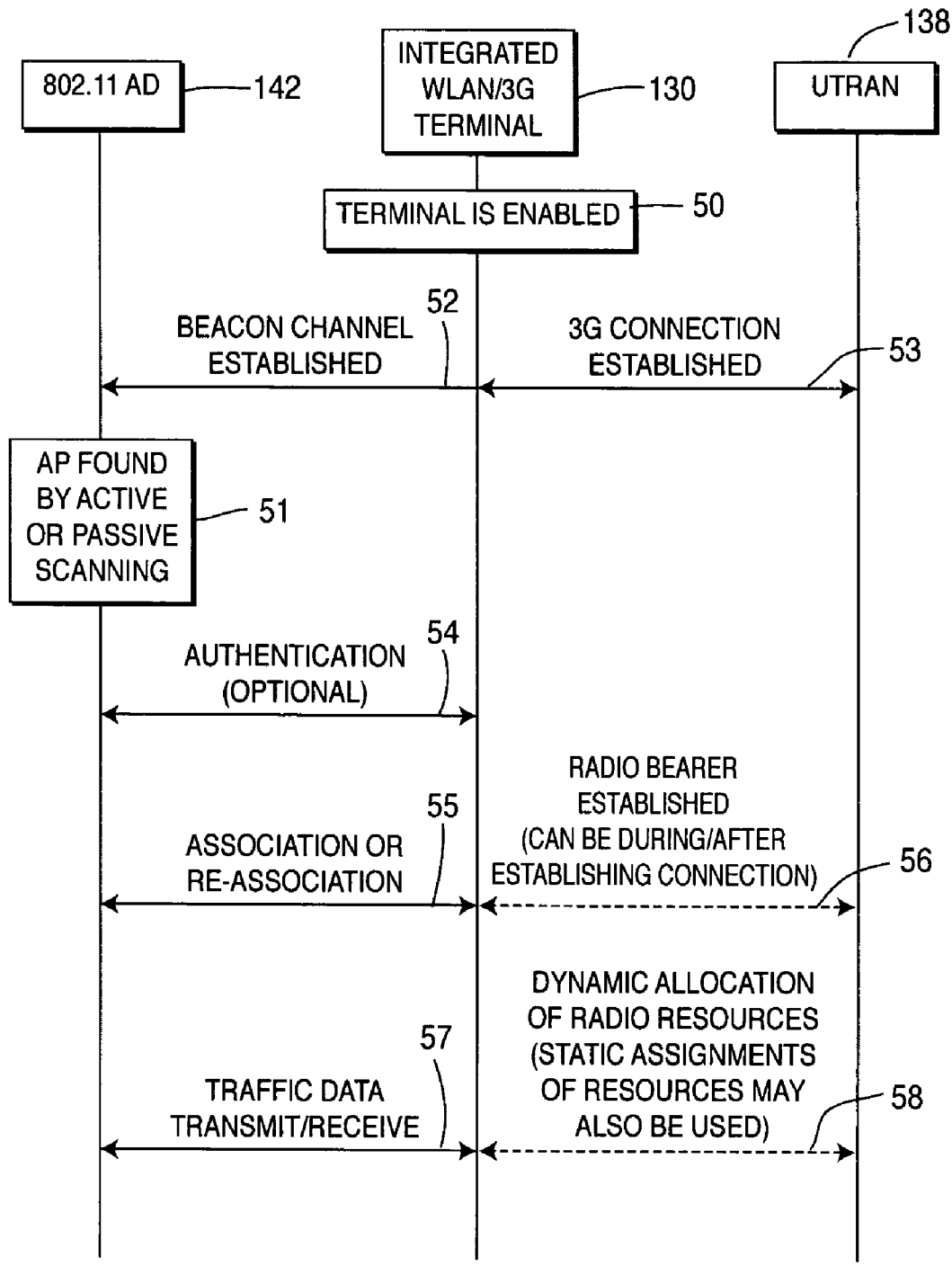
FIG. 5 is a signal flow diagram for "always on" channel establishment implemented by the system of FIG. 2.

FIG. 5 is a signal flow diagram of an exemplary embodiment for implementing an "always on" channel establishment procedure, whereby the terminal 130 of system 150 (shown in FIG. 2) is coupled with the UTRAN 138 and the access device 142. Once the terminal 130 is enabled (step 50), a 3G connection is established (step 53), between the terminal 130 and the UTRAN 138. The integrated access point/3G terminal 130 establishes the beacon channel (step 52) to the access device 142. The access device 142 realizes the integrated terminal 130 by standard IEEE 802.11 active or passive scanning methods (step 51). Authentication (step 54) of a user may be optionally implemented. The 3G radio bearer may be established either in conjunction with the 3G connection establishment procedure, (step 53), or in conjunction with the association/re-association, (step 55). Physical radio resources are either static assigned upon radio bearer establishment or dynamically allocated upon arrival of traffic data (IP packets), (step 58). Traffic data is transmitted/received (step 57) between the access device 142 and the UTRAN 138, via the integrated terminal 130.

Figure 6:
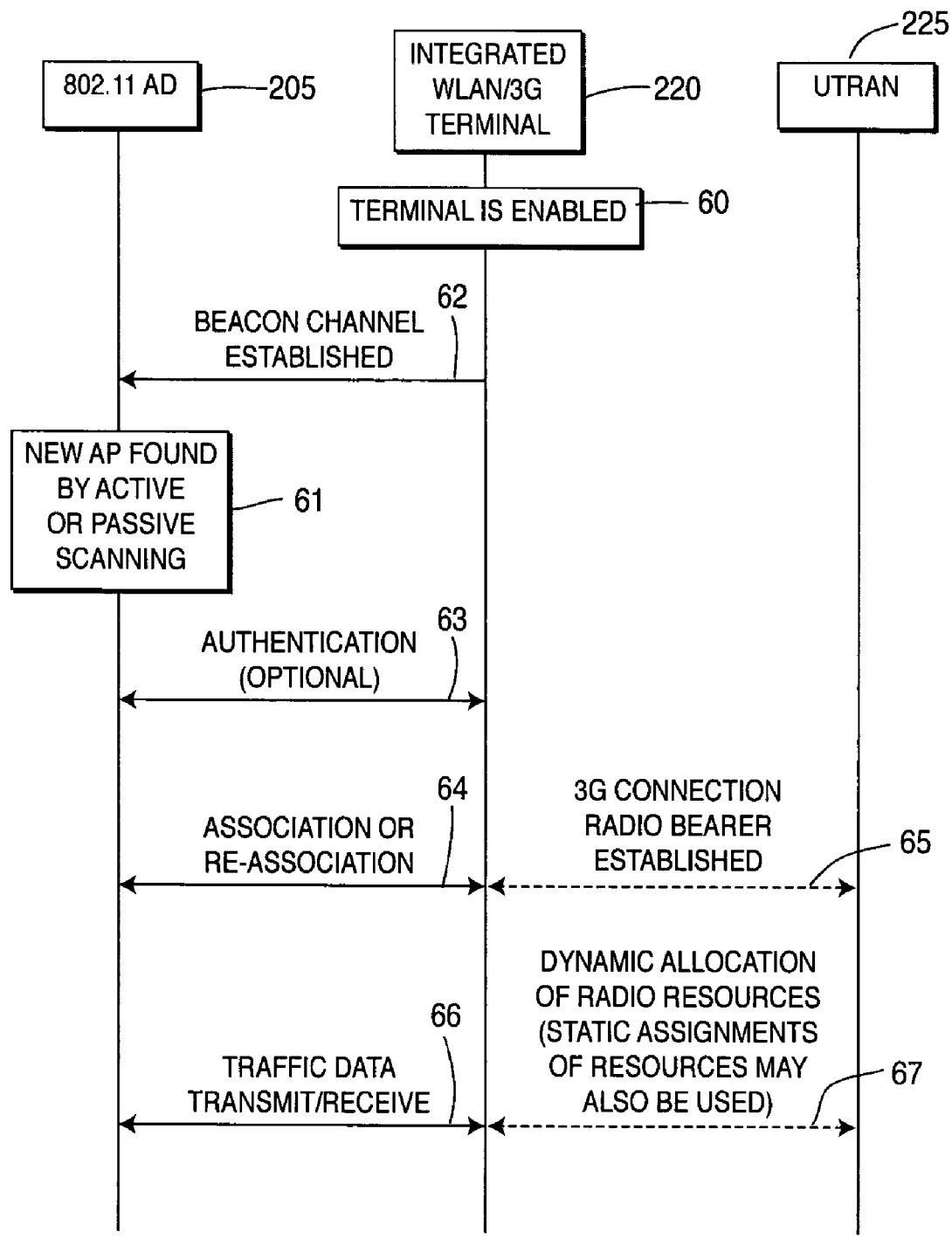
FIG. 6 is a signal flow diagram for a sequence of events implemented by the system of FIG. 3.

FIG. 6 is a signal flow diagram of an exemplary embodiment for implementing a sequence of events, whereby the terminal 220 of system 200 (shown in FIG. 3) is coupled with the UTRAN 225 and the access device 205. Once the terminal 220 is enabled (step 60), the 802.11 beacon channel is established. The access device 205 recognizes the integrated 802.11 access point/3G terminal 220 by standard IEEE 802.11 active or passive scanning methods (step 61). When using passive scanning, the access device 205 receives a beacon transmission (step 62) from the terminal 220. Authentication (step 63), of a user may be optionally implemented. Upon detection in the integrated terminal 220 of the 802.11 association or re-association procedure (step 64), the integrated terminal 220 establishes a 3G connection and a radio bearer (step 65), between the terminal 220 and the UTRAN 225. Traffic data is transmitted/received (step 66), between the access device 205 and UTRAN 225 via the terminal 220. 3G physical radio resources are either dynamically allocated upon arrival of traffic data (IP packets) (step 67), or statically assigned upon radio bearer establishment.

Although the integrated AP/3G terminals referred to herein may be considered to be an AP infrastructure topology for IEEE 802.11 networks, it is also possible to establish IEEE 802.11 "AdHoc" networks where no AP is involved. In this case, the access device or "station" may be similarly integrated with the 3G user terminal.

The foregoing describes a preferred example of an initialization scheme as per the invention. While this invention has been particularly shown and described with reference to a preferred embodiment, it will be understood by those skilled in the art that various changes in form and details may be made therein without departing from the scope of the invention as described hereinabove.

What is claimed is:

1. A wireless system for facilitating seamless network connectivity, the system comprising:
   (a) an integrated terminal including:
       (i) a first access point (AP); and
       (ii) a wireless transmit/receive unit (WTRU) coupled to the first AP via a first interface;
   (b) a universal terrestrial radio access network (UTRAN) coupled to the integrated terminal via a second interface;
   (c) at least one wireless local area network (WLAN) access device coupled to the integrated terminal via a third interface, wherein the UTRAN provides the integrated terminal with access to an external network via the third interface; and
   (d) a second AP coupled to the WLAN access device via a fourth interface, wherein the WLAN access device provides the integrated terminal with access to the external network via the third and fourth interfaces.

2. The system of claim 1 wherein each of the second, third and fourth interfaces are wireless interfaces.

3. The system of claim 1 wherein the external network is the Internet.

4. The system of claim 1 wherein the WTRU and the UTRAN manually or automatically establish a Third Generation (3G) connection to the external network.

5. The system of claim 4 wherein the WLAN access device realizes the integrated terminal by standard IEEE 802.11 active or passive scanning methods.

6. The system of claim 4 wherein the 3G connection is released upon timeout of a preconfigured inactivity timer.

7. The system of claim 4 wherein the 3G connection is permanently established to consistently provide services or facilitate a fast handover between service providers that use different radio access technology.

8. The system of claim 1 wherein each of the second and third interfaces is associated with a different radio access technology and are logically independent of each other.

9. The system of claim 1 wherein the integrated terminal operates in accordance with IEEE 802.11 specifications.

10. The system of claim 1 wherein the WLAN access device operates in accordance with IEEE 802.11 specifications.

11. The system of claim 1 wherein the second AP operates in accordance with IEEE 802.11 specifications.

12. The system of claim 1 wherein the UTRAN operates in accordance with Third Generation (3G) specifications.

13. The system of claim 1 wherein the WTRU operates in accordance with Third Generation (3G) specifications.

14. The system of claim 1 wherein the WLAN access device is a laptop computer.

15. The system of claim 1 wherein the WLAN access device is a personal digital assistant (PDA).

16. The system of claim 1 wherein the integrated terminal further comprises an Internet Protocol (IP) application processor coupled to the first AP for enabling several independent access devices and/or IP applications within the integrated terminal to be supported simultaneously.

17. A wireless system for facilitating seamless Internet connectivity, the system comprising:
  (a) an integrated terminal including:
    (i) an access point (AP) that uses a first type of radio access technology; and
    (ii) a wireless transmit/receive unit (WTRU) that uses a second type of radio access technology;
  (b) a first wireless routing device coupled to the integrated terminal via a first wireless interface, the first wireless routing device using the first type of radio access technology to provide the integrated terminal with access to the Internet via the first wireless interface; and
  (c) at least one second wireless routing device coupled to the integrated terminal via a second wireless interface, the second wireless routing device using the second type of radio access technology to provide the integrated terminal with access to the Internet via the second wireless interface, wherein the first and second wireless interfaces are logically independent of each other.

18. The system of claim 17 wherein the first type of radio access technology operates in accordance with Third Generation (3G) specifications.

19. The system of claim 17 wherein the second type of radio access technology operates in accordance with IEEE 802.11 specifications.

20. The system of claim 17 wherein the first wireless routing device is a universal terrestrial radio access network (UTRAN).

21. The system of claim 20 wherein the WTRU and the UTRAN manually or automatically establish a Third Generation (3G) connection to the Internet.

22. The system of claim 21 wherein the 3G connection is released upon timeout of a preconfigured inactivity timer.

23. The system of claim 21 wherein the 3G connection is permanently established to consistently provide services or facilitate a fast handover between service providers that use different radio access technology.

24. The system of claim 17 wherein the second wireless routing device is a wireless local area network (WLAN) access device.

25. The system of claim 24 wherein the WLAN access device realizes the integrated terminal by standard IEEE 802.11 active or passive scanning methods.

26. The system of claim 24 wherein the WLAN access device is a laptop computer.

27. The system of claim 24 wherein the WLAN access device is a personal digital assistant (PDA).

28. The system of claim 17 wherein the integrated terminal further comprises an Internet Protocol (IP) application processor coupled to the AP for enabling several independent access devices and/or IP applications within the integrated terminal to be supported simultaneously.

29. A wireless system for facilitating seamless network connectivity, the system comprising:
  (a) an integrated terminal including:
    (i) an access point (AP); and
    (ii) a wireless transmit/receive unit (WTRU) coupled to the AP via a first interface;
  (b) a universal terrestrial radio access network (UTRAN) coupled to the integrated terminal via a second interface; and
  (c) at least one wireless local area network (WLAN) access device coupled to the integrated terminal via a third interface, wherein the UTRAN provides the integrated terminal with access to an external network via the third interface, the WTRU and the UTRAN establish a Third Generation (3G) connection to the external network, and the 3G connection is permanently established to consistently provide services or facilitate a fast handover between service providers that use different radio access technology.

30. The system of claim 29 wherein the external network is the Internet.

31. A wireless system for facilitating seamless network connectivity, the system comprising:
  (a) an integrated terminal including:
    (i) an access point (AP); and
    (ii) a wireless transmit/receive unit (WTRU) coupled to the AP via a first interface;
  (b) a universal terrestrial radio access network (UTRAN) coupled to the integrated terminal via a second interface; and
  (c) at least one wireless local area network (WLAN) access device coupled to the integrated terminal via a third interface, wherein each of the second and third interfaces is associated with a different radio access technology and are logically independent of each other.

32. A wireless system for facilitating seamless network connectivity, the system comprising:
  (a) an integrated terminal including:
    (i) an access point (AP);
    (ii) a wireless transmit/receive unit (WTRU) coupled to the AP via a first interface; and
    (iii) an Internet Protocol (IP) application processor coupled to the AP for enabling several independent access devices and/or IP applications within the integrated terminal to be supported simultaneously;
  (b) a universal terrestrial radio access network (UTRAN) coupled to the integrated terminal via a second interface; and
  (c) at least one wireless local area network (MILAN) access device coupled to the integrated terminal via a third interface.

* * * * *

UNITED STATES PATENT AND TRADEMARK OFFICE
CERTIFICATE OF CORRECTION

PATENT NO.       : 7,006,481 B2                                         Page 1 of 1
APPLICATION NO.  : 10/681025
DATED            : February 28, 2006
INVENTOR(S)      : Stephen E. Terry It is certified that error appears in the above-identified patent and that said Letters Patent is hereby corrected as shown below:

At column 3, line 59, after the word "establish", delete "an" and insert therefor--a--.

At column 5, line 1, after the word "over", delete "an" and insert therefor --a--.

At claim 32, column 8, line 53, after the word "network", delete "(MILAN)" and insert therefor --(WLAN)--.

At claim 29, column 8, line 22, after the word "access", delete "technology" and insert therefor --technologies--.

At claim 32, column 8, line 53, after the word "network", delete "(MILAN)" and insert therefor --(WLAN)--.

Signed and Sealed this

Second Day of October, 2007

JON W. DUDAS
*Director of the United States Patent and Trademark Office*